(12) United States Patent
Probst et al.

(10) Patent No.: US 6,282,966 B1
(45) Date of Patent: Sep. 4, 2001

(54) PRESSURE SENSOR APPARATUS WITH SEPARATION MEMBRANE HELD BETWEEN SENSOR AND MEASURING CELL HOUSING BODIES

(75) Inventors: Uwe Probst, Orsingen-Nenz; Robert Skofljanec, Moos-B, both of (DE)

(73) Assignee: TRW Automotive Electronics & Components GmbH & Co. KG (DE)

( * ) Notice: Subject to any disclaimer, the term of this patent is extended or adjusted under 35 U.S.C. 154(b) by 0 days.

(21) Appl. No.: 09/254,911
(22) PCT Filed: Jun. 25, 1997
(86) PCT No.: PCT/DE97/01323
  § 371 Date: Nov. 10, 1999
  § 102(e) Date: Nov. 10, 1999
(87) PCT Pub. No.: WO98/12526
  PCT Pub. Date: Mar. 26, 1998

(30) Foreign Application Priority Data

Sep. 16, 1996 (DE) ............................... 196 37 763

(51) Int. Cl.⁷ ................................. G01L 7/08; B60L 1/00
(52) U.S. Cl. ................................. 73/715; 307/9.1
(58) Field of Search .............................. 73/715, 716, 717, 73/718, 719, 727, 756; 307/9.1, 118, 144; 123/146.5, 445

(56) References Cited

U.S. PATENT DOCUMENTS 4,928,376  5/1990  Poglitsch .
5,343,757  9/1994  Tate .
5,595,939  1/1997  Otake et al. .

FOREIGN PATENT DOCUMENTS 0 724 277 A2  11/1995  (DE) .
0 677 727 A2   4/1995  (FR) .
63-298129    12/1988  (JP) .
7-243926      9/1995  (JP) .

Primary Examiner—Benjamin R. Fuller
Assistant Examiner—Abdullahi Aw-Musse
(74) Attorney, Agent, or Firm—Fay, Sharpe, Fagan, Minnich & McKee, LLP

(57) ABSTRACT

A pressure sensor unit 1 is provided, specifically for automotive engineering applications. A pressure measuring cell 5 is disposed within a main body housing 3, the main body housing having a recess 17 holding a pressure sensor 21 and a pressure transmission medium 27. A separation membrane 31 is disposed between the pressure transmission medium and a supply opening 15 formed in the housing 3, the separation membrane separating the sensed pressure medium from the pressure transmission medium and also closing off and admission opening 29 in the measuring cell housing. The separation medium is held in place between an exterior surface of the measuring cell housing and an interior cooperating surface of the main body housing whereby a sealing closure of the admission opening is established by means of a relative clamping force between the respective cooperating exterior surface of the measuring cell housing and the interior surface of the main body housing when the measuring cell housing and the main body housing are brought into a respective connected position.

15 Claims, 1 Drawing Sheet

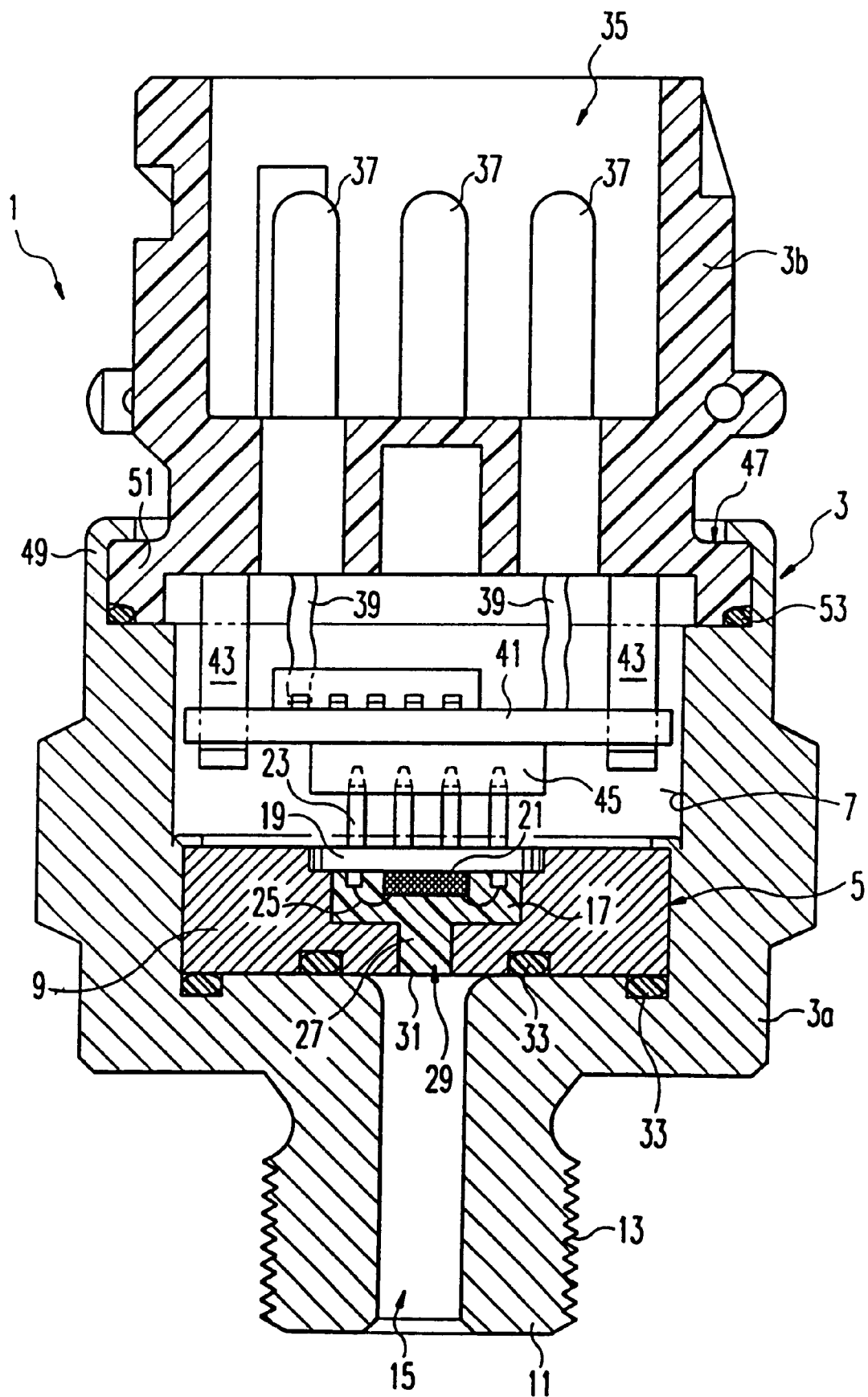

PRESSURE SENSOR APPARATUS WITH SEPARATION MEMBRANE HELD BETWEEN SENSOR AND MEASURING CELL HOUSING BODIES

The invention relates to a Pressure Sensor Unit, specifically for automotive engineering, with characteristics according to the preamble of Patent Claim 1.

Pressure Sensor units are known in a variety of designs and are used, for example, in automotive engineering as sensor elements for monitoring the oil pressure of engines or the brake pressure.

Such pressure sensor units comprise, as a rule, a housing with a supply opening for the pressure medium, whose pressure must be monitored, whereby the pressure medium is transported via the supply opening to a pressure measuring cell fitted in the housing. The housing of the pressure sensor unit may have, for example, in an anterior region, an exterior thread, which serves for screwing the pressure sensor unit into a corresponding inner thread of the system that is to be monitored.

Since specifically in automotive engineering high long-term stability is a requirement, combined with simultaneous resistance against aggressive media and rough environmental conditions, specifically so-called media-separated pressure sensor units are being employed here, in which the pressure medium, whose pressure is to be monitored, does not come in contact with the sensor element itself which is arranged in the pressure measuring cell fitted in the housing of the pressure sensor unit.

A separation membrane is employed for media separation, which membrane hermetically seals an admission opening of the pressure measuring cell, and which is acted upon by the to be monitored pressure medium. The pressure acting upon the separation membrane is transmitted via a pressure transmission medium to the pressure sensor itself contained in the pressure measuring cell. In the known pressure measuring cells or pressure sensor units a silicon oil is used as pressure transmission medium. The separation membrane is mostly designed in form of a thin specialty steel foil, which is welded together, such as laser-welded, with the housing of the pressure measuring cell. Following the welding, the interior of the pressure measuring cell, in which is arranged the pressure sensor proper, is filled with the silicon oil by means of a small filling tube.

Such type of pressure measuring cell, which is known for example from "SENSORMAGAZIN April 1989, pages 16 to 10" has, however, a complicated construction as a result of the welding process for the separation membrane and the filling process via the small filling tube, which results in commensurately high manufacturing costs. The complicated construction requires, as a rule, that such pressure measuring cells must be installed by an OEM manufacturer as finished, functioning elements, and the end user, for instance a motor vehicle manufacturer, can have no influence with regard to the constructive design of such measuring cells.

Moreover, from "SENSORREPORT May 1994, pages 22 to 24" a media-separated pressure measuring cell is known, where the membrane may consist of elastomers, such as EPDM, Viton or FVMO. For this pressure measuring cell, the membrane has a pot-like shape, whereby the bottom of the pot serves as separation membrane itself and the membrane is clamped at the upper, outwardly curved edge of the pot wall between two housing parts of the pressure measuring cell. The interior of the pressure measuring cell is again filled with silicon oil as pressure transmission medium.

With this type of pressuring measuring design, the relatively complicated design of the housing of the measuring cell is, however, a drawback with respect to installation and fastening of the separation membrane, which, likewise, has a relatively complicated design. This construction also requires that such type of pressure measuring cell is to be supplied fully functional by the manufacturer.

Proceeding from this state of the art, the object of the present invention is based on creating a pressure sensor unit, specifically for automotive engineering, which has a simple design and which, consequently, can be realized at low manufacturing costs.

The invention solves this object with the characteristics of Patent Claim 1. The invention proceeds from the knowledge that a very simple and cost effective design of the pressure sensor unit can be realized by means of simply clamping the separation membrane between the outer surfaces of the pressure measuring cell housing and the cooperating inner surfaces of the housing proper of the pressure sensor unit. The previously travelled path is no longer being travelled, according to which the pressure measuring cell itself is first completely manufactured to functional condition, and only afterwards mounted in the housing of an appropriately designed pressure sensor unit with a supply opening for the pressure medium and connection contacts for the sensor proper.

In the preferred specific embodiment of the invention, the measuring cell housing is equipped with a perforation, whose one opening represents the admission opening, which is to be sealed by the separation membrane, and whose other opening serves for installation of a support with a pressure sensor arranged thereon. The support may, for example, be designed as TO-housing with connection pins, onto which the sensor proper is mounted. The sensor may be designed in customary fashion, for instance as silicon membrane with integrated piezo-resistive semiconductor resistances. In the preferred specific embodiment of the invention, the separation membrane consists of synthetic material, preferably of a polyamide.

In the non-mounted state of the sensor unit, the separation membrane is preferably arranged as level foil. This results in the benefit of extremely low cost for the manufacture of the separation membrane.

In the preferred specific embodiment of the invention, the cooperating exterior surfaces of the separation membrane for clamping of the measuring cell housing and the interior surfaces of the pressure sensor unit are basically designed plane. This results in the benefit that into the corresponding recess of the housing of the pressure sensor unit, which is also connected with the supply opening for the pressure medium, only the separation membrane, preferably designed in form of a level foil, needs to be inserted and the pressure measuring cell subsequently introduced. For clamping of the membrane between the level surfaces, the housing of the pressure measuring cell is being stressed with a suitable press-on force.

For sealing of both the admission opening of the pressure measuring cell as well as the interior of the housing of the pressure sensor unit against the supply opening, one or several grooves may be provided in the respectively cooperating surfaces of the measuring cell housing or the housing of the pressure sensor unit, for acceptance of sealing elements, preferably O-rings. In non-mounted state, said sealing elements slightly project above the respective surface and effect simple and secure sealing by means of corresponding compression during installation.

In the preferred specific embodiment of the invention, in place of the former customary silicon oil as pressure transmission medium, a gel-like or jelly-type pressure transmission medium is employed. This produces the benefit of less complicated sealing of the pressure sensor unit, since such type of pressure medium does not have any creeping properties. The viscosity of a gel-like pressure transmission medium is preferably chosen in such manner that in essence there would not take place any gravity-produced flow-off of the gel from the recess of the measuring cell housing, or if there were any flow-off, it would be at an acceptably slow rate.

If the viscosity of the pressure transmission medium is reduced to the extent that a jelly-like consistency results, then any flow-off is totally prevented. In this respect one needs, however, to take into consideration that the hardness/elasticity of the jelly must be chosen in such manner that its function as a pressure transmission medium is maintained.

As a result of utilizing a jelly-like or gel-type pressure transmission medium, there is produced the benefit of simple fill-up of the recess of the pressure measuring cell, and simple installation of the pressure measuring cell in the housing of the pressure sensor unit.

In the preferred specific embodiment of the invention a two-component silicon gel or silicon jelly is employed as gel-type or jelly-like pressure transmission medium, or a two-component silicon-rubber gel or -jelly. This assures a simple filling process of the recess of the pressure measuring cell, since both components, immediately after the mixing, still have a relatively high viscosity and, consequently, simple filling is possible. After the "hardening" for instance by temperature or UV radiation, the desired viscosity or hardness/elasticity of the pressure transmission medium is obtained, with the result that any flow-off of the pressure transmission medium is avoided, even in case of minor leaks.

In the preferred specific embodiment of the invention, the housing of the pressure sensor unit is designed in two parts, whereby the pressure measuring cell is mounted in the first component fitted with the supply opening, and in the second component of the housing there are provided the connection contacts for contacting the sensor itself.

As a rule, there is also provided in the pressure sensor unit an electronic circuit for evaluation and/or processing of the pressure sensor signal, which can be directly connected with the connection contacts in the second part of the housing. Contacting of the pressure sensor can then take place in simple fashion by providing a frame on the electronic circuit, into which the pins of the pressure sensor can be inserted. Insertion can take place concurrently with installation of the two housing halves of the pressure sensor unit.

The electronic circuit can serve, for example, for temperature compensation of the sensor signal and/or realize a switching function of the pressure sensor unit. To that effect, the electronic circuit can compare the signal of the pressure measuring cell with at least one pre-set, preferably stored, threshold value, and in the event of either surpassing or falling short of the threshold value, generate one or several signals for at least one of the connection contacts or connect or separate two or more connection contacts.

Additional specific embodiments of the invention are apparent from the sub-claims The invention is described and explained in more detail by means of a specific embodiment illustrated in the drawing.

The sole FIGURE shows a specific embodiment of a pressure sensor unit 1 according to the invention, which consists of a two-part housing 3, in which there is arranged a pressure measuring cell 5.

The pressure measuring cell 5 is mounted in a lower, first housing part 3a, which has a recess 7 for that purpose. The recess 7 can be designed, for example, in form of a bore, which, at least in its lower portion, has an inner diameter which in essence corresponds to the measuring cell housing 9, preferably of disk-shape design.

This first housing part 3a has in its lower region a basically circular-cylindrical prolongation 11, which can be screwed at the place of assembly into a corresponding thread bore, for example of a brake system or in a motor block.

For feeding the pressure medium whose pressure must be recorded there is provided a supply opening 15, starting from the frontal surface of the prolongation 11 of the first housing part 3a, through which the pressure medium is passed to the pressure measuring cell.

The pressure measuring cell has in its measuring cell housing 9 a perforation 17, which, as depicted in the drawing, can be designed in the lower region of the measuring cell housing 9, in form of a bore with relatively lesser diameter and in the upper region of the measuring cell housing 9 as bore having a larger diameter. In the upper region of the bore having a larger diameter there is provided, relative to the diameter, another enlarged region which serves for acceptance of a support 19, on which there is arranged the pressure sensor proper 21. It can, for example, be designed as silicon membrane with piezo-resistive semiconductor resistances. The support has connection pins 23, which are connected with the pressure sensor 21 by means of bond wires 25. The support can beneficially be designed as TO-housing, which is usually used for acceptance of transistors or other semiconductor components. This results in the benefit of favorable manufacturing costs.

The TO-housing or its support 19 can, following installation in the expanded upper region of the perforation of the metallic measuring cell housing 9, be tightly welded with same. The resistance welding process can be employed as welding process, which, likewise, includes the benefit of favorable manufacturing costs.

After welding the support 19 to the measuring cell housing, the remaining interior space of the perforation 17 can then be filled with pressure transmission medium 27.

The pressure transmission medium 27 preferably to be employed according to the invention has gel-like or jelly-type consistency. With a gel-like consistency the viscosity according to the invention is selected in such manner that flow-off of the pressure transmission medium 27 from the admission opening 29 of the measuring cell housing 9 is prevented or at least occurs only at an acceptably slow rate, if the axis of the admission opening 29 does not extend exactly parallel to the direction of gravity and the admission opening points in upward direction.

With utilization of a pressure transmission medium with jelly-type consistency any flow-off is, in fact, impossible due to the cross section which tapers off in the direction of the exit opening of the admission opening 19. With jelly-like consistency of the pressure medium 27, attention has to be paid, however, that its hardness/elasticity is chosen in such manner that there is assurance of efficient pressure transmission from the exit opening of the admission opening 29 to the pressure sensor proper 21.

According to the invention, a two-component silicon-gel or a two-component silicon-rubber gel, with respectively jelly-like or gel-type consistency is customarily employed. Such pressure transmission medium has the benefit that immediately after mixing of the two components, the pressure transmission medium still has a relatively high viscosity, so that simple filling of the interior of the perforation 17 of the measuring cell housing 9 is assured, specifically the complete fill-up of the perforation with the pressure transmission medium.

The two components "harden" as a result of a chemical reaction, which can, for example, be promoted by supply of heat or UV-light, as a result of which they take on the desired jelly-like or gel-type consistency. The desired consistency can be adjusted by establishing a suitable mixing ratio for the two components.

After filling the interior of the perforation 17 with the pressure transmission medium, a separation membrane 31 is placed at the bottom into the recess 7, of the lower first housing part 3a of the pressure sensor unit 1. The size of the separation membrane should be selected so that the bottom admission opening of the supply opening 15 is covered for the pressure medium. In order to guarantee highly reliable sealing, the separation membrane 31 may be designed, as illustrated in the drawing, in circular form, whereby the diameter of the separation membrane likewise corresponds, in essence, to the interior diameter of the lower region of recess 7.

In order to securely seal off the interior of housing 7 and, simultaneously, the inner space of the perforation 17 of the measuring cell housing 9 against the pressure medium passed via the supply opening 15, there may be provided grooves, both at the lower frontal surface of the measuring cell housing 9, and at the bottom of the recess 7 of the lower housing part 3a, for acceptance of sealing elements 33, which can preferably be designed as O-rings. The depth of the grooves is hereby selected in such manner that the sealing elements, which have sufficient elasticity or compression capacity, slightly protrude, in non-mounted state of the measuring cell housing, beyond the respective surface.

After placing the separation membrane 31 into the recess 7, the measuring cell 5 is introduced into the recess, until it likewise rests, with its underside on the separation membrane 31. In this position, the measuring cell 5 is fixated, whereby assurance must be had that sufficient pressure is exerted in the direction toward the bottom of the recess 7, in order to guarantee adequate sealing. As shown in the FIGURE, the fixing of the measuring cell 5 can take place in that by means of a peeling process, one or several regions or a circumferential region of the lateral interior wall of the recess 7, are brought into a, the measuring cell housing hind-grabbing, position. In this manner it is possible to generate during and via the installation process a suitable pressure upon the measuring cell housing 9, which, in essence, also is retained following completion of the peeling process.

In this manner, it is possible to simultaneously seal off in one single manufacturing step, the interior of the perforation 17 with its pressure transmission medium contained therein and the interior of the recess 7 of the lower housing part 3a.

In the upper second housing part 3b, there are provided in a plug connection region, connection contacts 37, via which the pressure sensor unit 1 can be contacted via a plug which is not represented. The connection contacts can be connected by means of, for example, connection lines 39 with an electronic circuit, likewise held in the upper second housing part 3b.

To that end, the electronic circuit can be fixed by means of holding elements 43 in housing part 3b (see FIGURE) or it can also be directly supported by ends projecting from the housing interior of the connection contacts, injected, for example, in the housing part 3b.

In the simplest case, the electronic circuit 41 can consist of only a printed conductor plate, on which are arranged the required components. Simultaneously, the conductor plate can have a frame 45 for acceptance of the connection pins 23 of support 19. Contact between electronic circuit and pressure sensor 21 then simply takes place concurrently with positioning the upper housing part 3b onto the lower housing part 3a.

For that purpose, the lower housing part 3a can have, as depicted in the FIGURE, an acceptance region 47 with a shoulder as stop for the frontal side of the upper housing part 3b, and also an upper housing wall 49, which, after placement of the upper housing part 3b onto the lower housing part 3a, protrudes via a shoulder 51 from the underside of the upper housing part 3b. After joining both housing parts 3a, 3b, same can be re-flanged for firm connection of the housing parts.

In order to warrant tight sealing of the housing interior, another sealing element 53, for example in form of an O-ring, can be provided at the junction of the two housing parts.

The electronic circuit can produce, in known fashion, a temperature compensation of the sensor signal and/or an amplification of the signal. If that should not be needed, it is self-understood that the sensor can also be directly connected with the connection contacts 37.

Moreover, the electronic circuit can also undertake another processing of the sensor signal: for example, the electronic circuit can compare the signal of the pressure measuring cell with one or several pre-set, preferably stored, threshold values, and provoke corresponding actions or trigger signals upon exceeding and/or falling short of the threshold values. To that end, the sensor signal may be digitalized, so that practically any type of action can be derived from the sensor signal by means of a microprocessor or an appropriately designed, user-specific switching network (ASIC). Thus, for example a switch with several switching points can also be realized. In order to change the switching points it is merely necessary to input different threshold values into the electronic circuit. Needless to say, much more complicated functions can also be integrated.

What is claimed is:

1. A pressure sensor unit comprising:

a main body housing defining a supply opening for transmitting a pressure medium into an interior of the main body housing, the main body housing having connection contacts leading from the housing interior toward an exterior of the main body housing;

a pressure measuring cell disposed in the main body housing, the pressure measuring cell including a measuring cell housing defining a recess having an admission opening adjacent said supply opening;

a pressure sensor disposed in said recess;

a pressure transmission medium disposed in said recess and adapted to act upon the pressure sensor, the pressure transmission medium filling said recess up to said admission opening; and, a separation membrane disposed in the main body housing to seal between the admission opening and the supply opening for separating the pressure medium from the pressure transmission medium, the separation membrane being arranged between an exterior surface of the measuring cell housing and an interior cooperating surface of the main body housing of the pressure sensor unit, whereby a sealing closure of the admission opening of the pressure measuring cell is established by means of a relative clamping force between the respective cooperating exterior surface of the measuring cell housing and the interior surface of the main body housing when the measuring cell housing and the main body housing are brought into a respective connected position.

2. The pressure sensor unit according to claim 1 wherein:

the recess is formed as a perforation extending through the measuring cell housing to define said admission opening on a first end of the perforation and an installation opening on a second end of the perforation; and, the pressure sensor is carried on a support member in the main body housing, the pressure sensor being held by the support member to project into the recess, the support member being disposed in the main body housing to tightly seal the installation opening.

3. The pressure sensor unit according to claim 1 wherein said separation membrane is formed of a synthetic polyamide material.

4. The pressure sensor unit according to claim 1 wherein said separation membrane comprises a flat foil adapted to be held loosely in the main body housing prior to said relative clamping force between the respective cooperating exterior surface of the measuring cell housing and the interior surface of the main body housing.

5. The pressure sensor unit according to claim 1 wherein said exterior surface of the measuring cell housing and the interior surface of the main body housing are substantially planar.

6. The pressure sensor unit according to claim 5 further including:

at least one groove defined on at least one of said exterior surface of the measuring cell housing and said interior surface of the main body housing; and, at least one sealing element received in the at least one groove, the at least one sealing element being arranged to engagingly seal the separation membrane when the measuring cell housing and the main body housing are brought into said respective connected position.

7. The pressure sensor unit according to claim 1 wherein said pressure transmission medium has a one of a gel-like and a jelly-type consistency.

8. The pressure sensor unit according to claim 1 wherein said pressure transmission medium is a gel material having a desired viscosity selected to prevent flow of the gel material out of the recess as a result of gravity.

9. The pressure sensor unit according to claim 7 wherein said pressure transmission medium comprises a one of a two-component silicon gel and a two-component silicon-rubber gel having a first initial low viscosity immediately after mixing the two components, and having said one of said gel-like and jelly-type consistency of a predetermined elasticity after a setting period.

10. The pressure sensor unit according to claim 7 wherein said pressure transmission medium comprises a one of a two-component silicon gel and a two-component silicon-rubber gel having a first initial low viscosity immediately after mixing the two components, and having said desired viscosity of a predetermined elasticity after a setting period.

11. The pressure sensor unit according to claim 8 wherein said pressure transmission medium comprises a one of a two-component silicon gel and a two-component silicon-rubber gel having a first initial low viscosity immediately after mixing the two components, and having said one of said gel-like and jelly-type consistency of a predetermined elasticity after a setting period.

12. The pressure sensor unit according to claim 8 wherein said pressure transmission medium comprises a one of a two-component silicon gel and a two-component silicon-rubber gel having a first initial low viscosity immediately after mixing the two components, and having said desired viscosity of a predetermined elasticity after a setting period.

13. The pressure sensor unit according to claim 1 wherein said main body housing includes a first housing part adapted to receive said measuring cell and a second housing part adapted to receive said connection contacts.

14. The pressure sensor unit according to claim 1 further including an electronic circuit disposed in said main body housing for processing signals generated by said pressure sensor, the electronic circuit being connected to said connection contacts.

15. The pressure sensor unit according to claim 1 wherein said electronic circuit includes means for comparing said signals generated by said pressure sensor with at least one predetermined pressure threshold value range and, when the signals generated by said pressure sensor are outside of said pressure threshold value range, generating a signal on said connection contacts.

* * * * *